United States Patent [19]
Thomas et al.

[11] Patent Number: 6,023,942
[45] Date of Patent: Feb. 15, 2000

[54] PROCESS FOR LIQUEFACTION OF NATURAL GAS

[75] Inventors: Eugene R. Thomas, Houston; Ronald R. Bowen, Magnolia; Eric T. Cole, Kingwood; Edward L. Kimble, Sugar Land, all of Tex.

[73] Assignee: Exxon Production Research Company, Houston, Tex.

[21] Appl. No.: 09/099,589

[22] Filed: Jun. 18, 1998

Related U.S. Application Data

[60] Provisional application No. 60/050,280, Jun. 20, 1997, and provisional application No. 60/079,612, Mar. 27, 1998.

[51] Int. Cl.[7] ............................................. F25J 1/00
[52] U.S. Cl. .................................. 62/613; 62/619
[58] Field of Search ...................... 62/612, 613, 619, 62/620, 614, 618, 631

[56] References Cited

U.S. PATENT DOCUMENTS

| | | | |
|---|---|---|---|
| 3,298,805 | 1/1967 | Secord et al. | 48/190 |
| 3,349,571 | 10/1967 | Nebgen | 62/619 |
| 3,433,026 | 3/1969 | Swearingen | 62/23 |
| 3,477,509 | 11/1969 | Arendt | 166/252 |
| 3,677,019 | 7/1972 | Olszewski | 62/9 |
| 3,724,226 | 4/1973 | Pachaly | 62/39 |
| 3,735,600 | 5/1973 | Dowdell et al. | 62/39 |
| 4,147,525 | 4/1979 | Bradley | 62/613 |
| 4,157,904 | 6/1979 | Campbell et al. | 62/27 |
| 4,315,407 | 2/1982 | Creed et al. | 62/53 |
| 4,456,459 | 6/1984 | Brundige, Jr. | 62/9 |
| 4,541,852 | 9/1985 | Newton et al. | 62/613 |
| 4,548,629 | 10/1985 | Chiu | 62/613 |
| 4,638,639 | 1/1987 | Marshall et al. | 62/9 |
| 4,687,499 | 8/1987 | Aghili | 62/24 |
| 4,698,081 | 10/1987 | Aghili | 62/24 |
| 4,778,497 | 10/1988 | Hanson et al. | 62/11 |
| 5,036,671 | 8/1991 | Nelson et al. | 62/23 |
| 5,199,266 | 4/1993 | Johansen | 62/8 |
| 5,363,655 | 11/1994 | Kikkawa et al. | 62/9 |
| 5,473,900 | 12/1995 | Low | 62/9 |
| 5,615,561 | 4/1997 | Houshmand et al. | 62/611 |
| 5,651,269 | 7/1997 | Prevost et al. | 62/613 |
| 5,669,234 | 9/1997 | Houser et al. | 62/612 |
| 5,755,114 | 5/1998 | Foglietta | 62/618 |
| 5,802,874 | 9/1998 | Voit | 62/650 |
| 5,836,173 | 11/1998 | Lynch et al. | 62/613 |
| 5,878,814 | 3/1999 | Breivik et al. | 166/267 |

FOREIGN PATENT DOCUMENTS

| | | | |
|---|---|---|---|
| 2039352 | 8/1980 | United Kingdom | 62/613 |
| WO 97/01069 | 1/1997 | WIPO . | |
| WO 97/13109 | 4/1997 | WIPO . | |

OTHER PUBLICATIONS

Broeker, Roger J.; "CNG and MLG—New Natural Gas Transportation Processes" American Gas Journal, Jul. 1969.

Petsinger, R. E. *LNG on the Move, GAS*, (Dec. 1967), pp. 45–59.

Bennett, C. P. Marine Transportation of LNG at Intermediate Ttemperature, *CME* (Mar. 1979), pp. 63–64.

Broeker, R. J. CNG and MLG–New Natural Gas Transportation Processes, *American Gas Journal* (Jul. 1969) pp. 138–140.

(List continued on next page.)

*Primary Examiner*—William Doerrler
*Attorney, Agent, or Firm*—Gary D. Lawson

[57] ABSTRACT

This invention relates to a process for liquefying a gas stream rich in methane and having a pressure above about 3103 kPa (450 psia). The gas stream is expanded to a lower pressure to produce a gas phase and a liquid product having a temperature above about –112° C. (–170° F.) and a pressure sufficient for the liquid product to be at or below its bubble point. The gas phase and the liquid product are then phase separated in a suitable separator, and the liquid product is introduced to a storage means for storage at a temperature above about –112° C. (–170° F.).

29 Claims, 3 Drawing Sheets

OTHER PUBLICATIONS

Faridany, E. K., Ffooks R. C., and Meikle, R. B. A Pressure LNG System, European Offshore Petroleum Conference & Exhibition (Oct. 21–24, 1980), vol. Eur 171, pp. 245–254.

Faridany, E. K., Secord, H.C, O'Brien, J. V., Pritchard, J. F., and Banister, M. The Ocean Phoenix Pressure—LNG System, *Gastech 76* (1976), New York, pp. 267–280.

Fluggen, Prof. E. and Backhaus, Dr. I. H. Pressurised LNG—and the Utilisation of Small Gas Fields, GasTech78, LNG/LPG Conference (Nov. 7, 1978), Monte Carlo pp. 195–204.

Gas Processors Suppliers Association. Turboexpanders, *Engineering Data Book* (1987), vol. I, Sec. 1–16, pp. 13–40:13–41.

Lynch, J. T. and Pitman, R. N. Improving Thoughput and Ethane Recovery at GPM's Goldsmith Gas Plant, Proceedings of the Seventy–Fifth Gas Processors Association Annual Convention, (Mar. 11–13, 1996), Denver, Colorado, pp. 210–217.

Maddox, R. N., Sheerar, L. F., and Erbar, J. H. Cryogenic Expander Processing, Gas Conditioning and Processing (Jan. 1982) vol. 3, 13–9:13–10.

Perret, J. Techniques in the Liquefaction of Natural Gas, *French Natural Gas* (Nov. 11, 1996), pp. 1537–1539.

Petsinger, R. E. *LNG on the Move*, Gas, (Dec. 1967), pp. 45–59.

Broeker, R. J. A New Process for the Transportation of Natural Gas, Proceedings of the First International Conference on LNG (1968), Chicago, Illinois, Session No. 5, Paper 30, pp. 1–11.

Lynch, J. T. and Pitman, R. N. Texas Plant Retrofit Improves Through $C_2$, Recovery, Oil and Gas Journal (Jun. 3, 1996, pp. 41–48.

PROCESS FOR LIQUEFACTION OF NATURAL GAS

This application claims the benefit of (i) U.S. Provisional Application Ser. No. 60/050280, filed Jun. 20, 1997; and (ii) U.S. Provisional Application Ser. No. 60/079612, filed Mar. 27, 1998.

FIELD OF THE INVENTION

This invention relates to a natural gas liquefaction process, and more particularly relates to a process to produce pressurized liquid natural gas (PLNG).

BACKGROUND OF THE INVENTION

Because of its clean burning qualities and convenience, natural gas has become widely used in recent years. Many sources of natural gas are located in remote areas, great distances from any commercial markets for the gas. Sometimes a pipeline is available for transporting produced natural gas to a commercial market. When pipeline transportation is not feasible, produced natural gas is often processed into liquefied natural gas (which is called "LNG") for transport to market.

One of the distinguishing features of a LNG plant is the large capital investment required for the plant. The equipment used to liquefy natural gas is generally quite expensive. The liquefaction plant is made up of several basic systems, including gas treatment to remove impurities, liquefaction, refrigeration, power facilities, and storage and ship loading facilities. While the cost of LNG plant can vary widely depending upon plant location, a typical conventional LNG project can cost from U.S. $5 billion to U.S. $10 billion, including field development costs. The plant's refrigeration systems can account for up to 30 percent of the cost.

In the design of a LNG plant, three of the most important considerations are (1) the selection of the liquefaction cycle, (2) the materials used in the containers, piping, and other equipment, and (3) the process steps for converting natural gas feed stream into LNG.

LNG refrigeration systems are expensive because so much refrigeration is needed to liquefy natural gas. A typical natural gas stream enters a LNG plant at pressures from about 4,830 kPa (700 psia) to about 7,600 kPa (1,100 psia) and temperatures from about 20° C. (68° F.) to about 40° C. (104° F.). Natural gas, which is predominantly methane, cannot be liquefied by simply increasing the pressure, as is the case with heavier hydrocarbons used for energy purposes. The critical temperature of methane is −82.5° C. (−116.5° F.). This means that methane can only be liquefied below that temperature regardless of the pressure applied. Since natural gas is a mixture of gases, it liquefies over a range of temperatures. The critical temperature of natural gas is between about −85° C. (−121° F.) and −62° C. (−80° F.). Typically, natural gas compositions at atmospheric pressure will liquefy in the temperature range between about −165° C. (−265° F.) and −155° C. (−247° F.). Since refrigeration equipment represents such a significant part of the LNG facility cost, considerable effort has been made to reduce refrigeration costs.

Although many refrigeration cycles have been used to liquefy natural gas, the three types most commonly used in LNG plants today are: (1) "cascade cycle" which uses multiple single component refrigerants in heat exchangers arranged progressively to reduce the temperature of the gas to a liquefaction temperature, (2) "multi-component refrigeration cycle" which uses a multi-component refrigerant in specially designed exchangers, and (3) "expander cycle" which expands gas from a high pressure to a low pressure with a corresponding reduction in temperature. Most natural gas liquefaction cycles use variations or combinations of these three basic types.

The expander system operates on the principle that gas can be compressed to a selected pressure, cooled, then allowed to expand through an expansion turbine, thereby performing work and reducing the temperature of the gas. It is possible to liquefy a portion of the gas in such an expansion. The low temperature gas is then heat exchanged to effect liquefaction of the feed. The power obtained from the expansion is usually used to supply part of the main compression power used in the refrigeration cycle. Examples of expansion processes for producing LNG are disclosed in U.S. Pat. Nos. 3,724,226; 4,456,459; 4,698,081; and WO 97/13109.

Materials used in conventional LNG plants also contribute to the plants' cost. Containers, piping, and other equipment used in LNG plants are typically constructed, at least in part, from aluminum, stainless steel or high nickel content steel to provide the necessary strength and fracture toughness at low temperatures.

In conventional LNG plants water, carbon dioxide, sulfur-containing compounds, such as hydrogen sulfide and other acid gases, n-pentane and heavier hydrocarbons, including benzene, must be substantially removed from the natural gas processing, down to parts-per-million (ppm) levels. Some of these compounds will freeze, causing plugging problems in the process equipment. Other compounds, such as those containing sulfur, are typically removed to meet sales specifications. In a conventional LNG plant, gas-treating equipment is required to remove the carbon dioxide and acid gases. The gas treating equipment typically uses a chemical and/or physical solvent regenerative process and requires a significant capital investment. Also, the operating expenses are high. Dry bed dehydrators, such as molecular sieves, are required to remove the water vapor. A scrub column and fractionation equipment are typically used to remove the hydrocarbons that tend to cause plugging problems. Mercury is also removed in a conventional LNG plant since it can cause failures in equipment constructed of aluminum. In addition, a large portion of the nitrogen that may be present in natural gas is removed after processing since nitrogen will not remain in the liquid phase during transport of conventional LNG and having nitrogen vapor in LNG containers at the point of delivery is undesirable.

There is a continuing need in the industry for an improved process for liquefying natural gas which minimizes the amount of treating equipment required.

SUMMARY

This invention relates to an improved process for liquefying a feed gas stream rich in methane. The feed gas stream has a pressure above about 3,100 kPa (450 psia). If the pressure is too low, the gas may be first compressed. The gas is liquefied by pressure expansion by a suitable expansion means to produce a liquid product having a temperature above about −112° C. (−170° F.) and a pressure sufficient for the liquid product to be at or below its bubble point temperature. Prior to the expansion, the gas is preferably cooled by recycle vapor that pass through the expansion means without being liquefied. A phase separator separates the liquid product from gases not liquefied by the expansion means. The liquid product from the phase separator is then introduced to a storage or transportation of a product at a temperature above about −112° C. (−170° F.).

In another embodiment of the invention, if the feed gas contains components heavier than methane, the predominant portion of the heavier hydrocarbons are removed by a fractionation process prior to the liquefaction by pressure expansion.

In still another embodiment of this invention, a boil-off gas resulting from evaporation of liquefied natural gas can be added to the feed gas for liquefaction by the pressure expansion to produce pressurized liquid natural gas (PLNG).

The process of the present invention can be used both for the initial liquefaction of a natural gas at the source of supply for storage or transportation, and to re-liquefy natural gas vapor given off during storage and ship loading. Accordingly, an object of this invention is to provide an improved liquefaction system for the liquefaction or reliquefaction of natural gas. Another object of this invention is to provide an improved liquefaction system wherein substantially less compression power is required than in prior art systems. A still further object of the invention is to provide an improved liquefaction process that is economical and efficient in operation. The very low temperature refrigeration of conventional LNG process is very expensive compared to the relatively mild refrigeration needed in the production of PLNG in accordance with the practice of this invention.

BRIEF DESCRIPTION OF THE DRAWINGS

The present invention and its advantages will be better understood by referring to the following detailed description and the attached Figures, which are schematic flow diagrams of representative embodiments of this invention.

The flow diagrams illustrated in the Figures present various embodiments of practicing the process of this invention. The Figures are not intended to exclude from the scope of the invention other embodiments that are the result of normal and expected modifications of these specific embodiments. Various required subsystems such as pumps, valves, flow stream mixers, control systems, and sensors have been deleted from the Figures for the purposes of simplicity and clarity of presentation.

DESCRIPTION OF THE PREFERRED EMBODIMENTS

The present invention is an improved process for liquefying natural gas by pressure expansion to produce a methane-rich liquid product having a temperature above about −112° C. (−170° F.) and a pressure sufficient for the liquid product to be at or below its bubble point. This methane-rich product is sometimes referred to in this description as pressurized liquid natural gas ("PLNG"). The term "bubble point" is the temperature and pressure at which a liquid begins to convert to gas. For example, if a certain volume of PLNG is held at constant pressure, but its temperature is increased, the temperature at which bubbles of gas begin to form in the PLNG is the bubble point. Similarly, if a certain volume of PLNG is held at constant temperature but the pressure is reduced, the pressure at which gas begins to form defines the bubble point. At the bubble point, the mixture is saturated liquid.

The gas liquefaction process of the present invention requires less power for liquefying the natural gas than processes used in the past and the equipment used in the process of this invention can be made of less expensive materials. By contrast, prior art processes that produce LNG at atmospheric pressures having temperatures as low as −160° C. (−256° F.) require process equipment made of expensive materials for safe operation.

The energy needed for liquefying the natural gas in the practice of this invention is greatly reduced over energy requirements of a conventional LNG plant. The reduction in necessary refrigeration energy required for the process of the present invention results in a large reduction in capital costs, proportionately lower operating expenses, and increased efficiency and reliability, thus greatly enhancing the economics of producing liquefied natural gas.

At the operating pressures and temperatures of the present invention, about 3½ weight percent nickel steel can be used in piping and facilities in the coldest operating areas of the liquefaction process, whereas the more expensive 9 weight percent nickel or aluminum is generally required for the same equipment in a conventional LNG process. This provides another significant cost reduction for the process of this invention compared to prior art LNG processes.

The first consideration in cryogenic processing of natural gas is contamination. The raw natural gas feed stock suitable for the process of this invention may comprise natural gas obtained from a crude oil well (associated gas) or from a gas well (non-associated gas). The composition of natural gas can vary significantly. As used herein, a natural gas stream contains methane ($C_1$) as a major component. The natural gas will typically also contain ethane ($C_2$), higher hydrocarbons ($C_{3+}$), and minor amounts of contaminants such as water, carbon dioxide, hydrogen sulfide, nitrogen, butane, hydrocarbons of six or more carbon atoms, dirt, iron sulfide, wax, and crude oil. The solubilities of these contaminants vary with temperature, pressure, and composition. At cryogenic temperatures, $CO_2$, water, and other contaminants can form solids, which can plug flow passages in cryogenic heat exchangers. These potential difficulties can be avoided by removing such contaminants if conditions within their pure component, solid phase temperature-pressure phase boundaries are anticipated. In the following description of the invention, it is assumed that the natural gas stream has been suitably treated to remove sulfides and carbon dioxide and dried to remove water using conventional and well known processes to produce a "sweet, dry" natural gas stream. If the natural gas stream contains heavy hydrocarbons which could freeze out during liquefaction or if the heavy hydrocarbons are not desired in the PLNG, the heavy hydrocarbon may be removed by a fractionation process prior to producing the PLNG as described in more detail below.

One advantage of the present invention is that the warmer operating temperatures enables the natural gas to have higher concentration levels of freezable components than would be possible in a conventional LNG process. For example, in a conventional LNG plant that produces LNG at −160° C. (−256° F.) the $CO_2$ must be below about 50 ppm to avoid freezing problems. In contrast, by keeping the process temperatures above about −112° C. (−170° F.), the natural gas can contain $CO_2$ at levels as high as about 1.4 mole % $CO_2$ at temperatures of −112° C. (−170° F.) and about 4.2% at −95° C. (−139° F.) without causing freezing problems in the liquefaction process of this invention.

Additionally, moderate amounts of nitrogen in the natural gas need not be removed in the process of this invention because nitrogen will remain in the liquid phase with the liquefied hydrocarbons at the operating pressures and temperatures of the present invention. The ability to reduce, or in some cases omit, the equipment required for gas treating and nitrogen rejection when the composition of the natural gas allows, provides significant technical and economic advantages. These and other advantages of the invention will be better understood by referring to the Figures.

Figure 1:
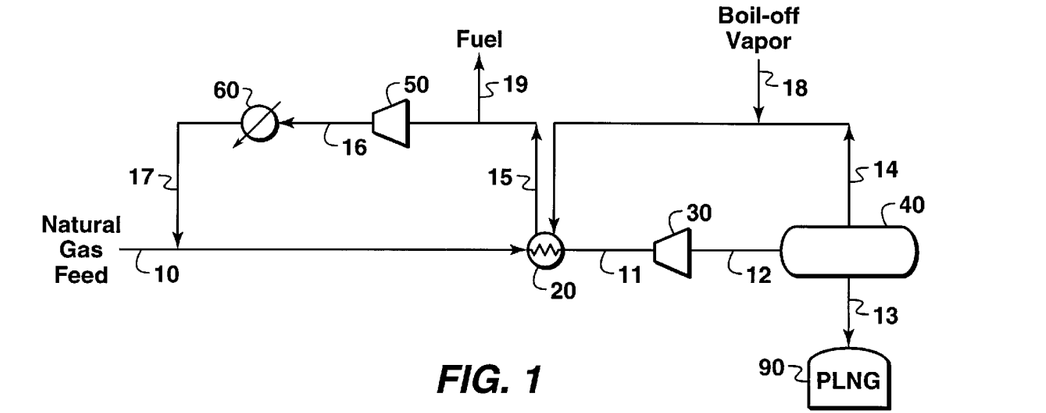
FIG. 1 is a schematic flow diagram of one embodiment of this invention to produce PLNG.

Referring to FIG. 1, natural gas feed stream 10 preferably enters the liquefaction process at a pressure above about 3,100 kPa (450 psia) and more preferably above about 4,827 kPa (700 psia) and preferably at temperatures below about 40° C. (104° F.); however, different pressures and temperatures can be used, if desired, and the system can be appropriately modified accordingly by persons of ordinary skill in the art after knowing the teachings of this invention. If the gas stream 10 is below about 3,102 kPa (450 psia), it can be pressurized by a suitable compression means (not shown), which may comprise one or more compressors.

The pressurized feed stream 10 is cooled by one or more heat exchangers 20. The cooled feed stream 11 is then expanded by at least one suitable expander means 30. The expander may be a commercial type of turboexpander which may be shaft-coupled to suitable compressors, pumps, or generators, enabling the work extracted from the expander to be converted into usable mechanical and/or electrical energy, thereby resulting in a considerable energy saving to the overall system.

The expander means 30 liquefies at least a portion of the natural gas stream 11 to produce stream 12. Stream 12 is conveyed to a conventional phase separator 40 which produces a liquid product stream 13, which is PLNG having a temperature above about −112° C. (−170° F.) and a pressure sufficient for the liquid product to be at or below the bubble point. The PLNG is passed to a suitable storage or transportation means 90 (such as a pipeline, stationary storage tank, or a carrier such as a PLNG ship, truck, or railcar) for containment at a temperature above about −112° C. (−170° F.). For the liquid product to remain in a liquid phase, the temperature must be below the critical temperature for the product, which will typically be below −62° C. (−80° F.). The separator 40 also produces a vapor overhead stream 14, which is passed through heat exchanger 20 where the vapor stream 14 cools the feed stream 10. One or more compressors then compress the vapor stream 15. FIG. 1 illustrates a preferred use of one compressor 50 to repressurize the recycle vapor to approximately the pressure of the incoming feed stream 10. However, additional compressors may be used in the practice of this invention. The compressed gas stream 16 is cooled by a heat exchanger 60 to recover heat values for use elsewhere or such cooling can be effected using air or water. After leaving the heat exchanger 60, the cooled vapor stream 17 is combined with feed stream 10 for recycling. In this embodiment, the feed stream can be liquefied without the need for a closed-loop refrigeration system.

In the storage, transportation, and handling of liquefied natural gas, there can be a considerable amount of "boil-off," the vapor resulting from evaporation of a liquefied natural gas. This invention is particularly well suited for liquefying boil-off vapor produced by PLNG. Referring to FIG. 1, boil-off vapor may be introduced to the liquefaction process through line 18 for combining with vapor stream 14 which is recycled as described above. The pressure of the boil-off vapor should preferably be at or near the pressure of gas stream 14. If the boil-off vapor is below the pressure of stream 14, the boil-off vapor can be pressurized by conventional compression means (not shown in FIG. 1).

A minor portion of the vapor stream 15 may optionally be removed from the process as fuel (stream 19) to supply a portion of the power needed to drive compressors and pumps in the liquefaction process. Although this minor portion can be withdrawn from the process at any point after exiting the separator 40, the fuel is preferably removed from the process after being warmed by heat exchanger 20.

Figure 2:
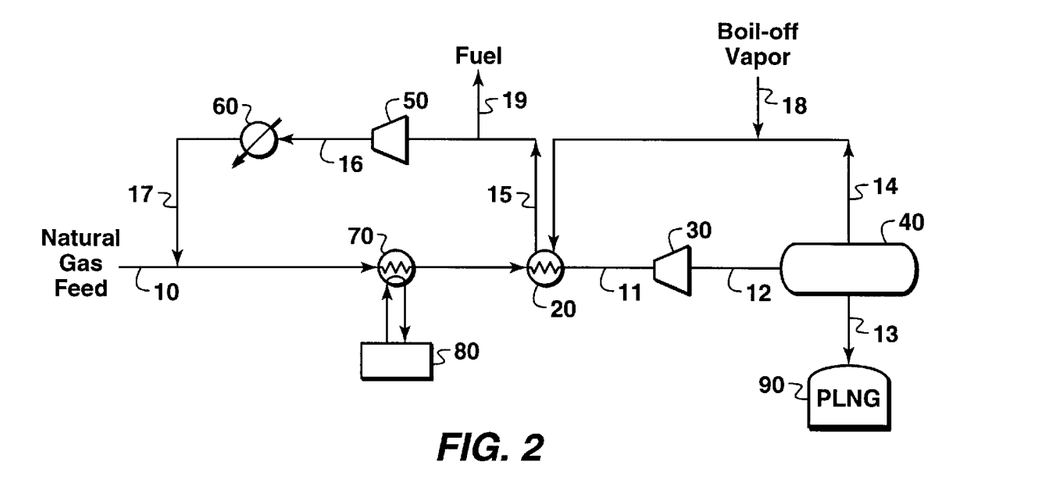
FIG. 2 is a schematic flow diagram of a second embodiment of this invention in which the natural gas is pre-cooled by a closed cycle refrigeration system prior to liquefaction of the natural gas by pressure expansion.

FIG. 2 illustrates another embodiment of process of this invention and in this embodiment the parts having like numerals to the parts in FIG. 1 have the same process functions. Those persons of ordinary skill in the art will recognize, however, that the process equipment from one embodiment to another may vary in size and capacity to handle different fluid flow rates, temperatures, and compositions. The embodiment illustrated in FIG. 2 is similar to the embodiment described in FIG. 1 except that additional cooling of the feed stream 10 is provided by heat exchanger 70. This FIG. 2 embodiment reduces the amount of recycle stream 14 and requires less power than the FIG. 1 embodiment. Refrigeration for the heat exchanger 70 is provided by a conventional closed-loop refrigeration system 80. The refrigerant for the refrigeration system can be propane, propylene, ethane, carbon dioxide, or any other suitable refrigerant.

Figure 3:
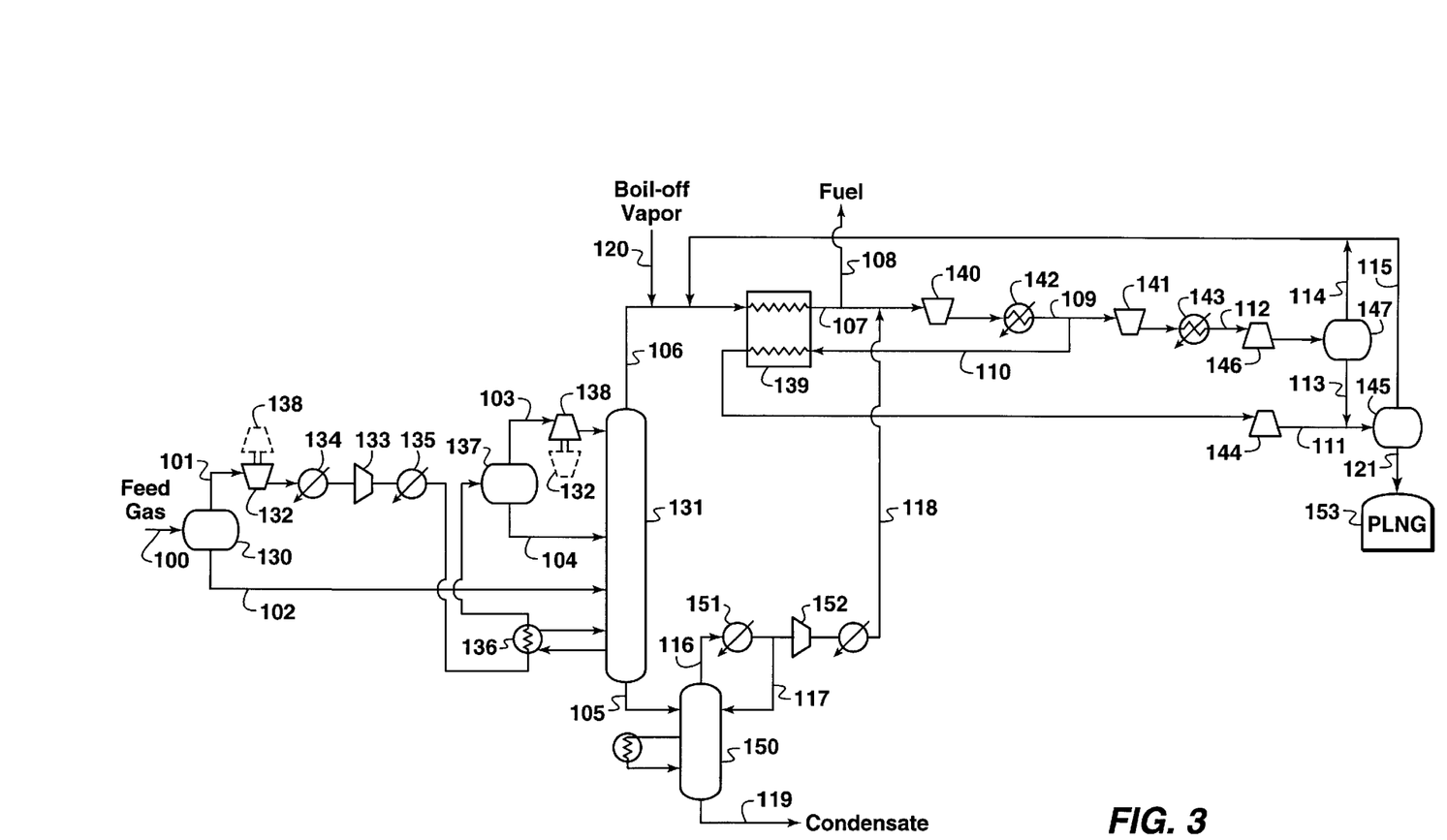
FIG. 3 is a schematic flow diagram of a third embodiment of this invention in which feed natural gas is fractionated before liquefaction to PLNG.

FIG. 3 illustrates still another embodiment of the present invention. This embodiment includes a system for removing heavy hydrocarbons and a split flow arrangement of the pressurized gas just upstream of the final liquefaction steps. This split flow arrangement can reduce overall power requirements as compared to the embodiment in FIG. 2 by allowing closer approaches in the main liquefaction exchanger 142. The split flow arrangement also allows more operational flexibility in handling varying amounts of boil-off gas from LNG or PLNG loading and unloading operations. Referring to FIG. 3, feed stream 100 enters separator 130 where the stream is divided into two separate streams, vapor stream 101 and liquid stream 102. Although not shown in FIG. 3, the feed stream 100 may be cooled by any suitable cooling system prior to being fed to separator 130. Liquid stream 102 is passed to a conventional demethanizer 131. Vapor stream 101 passes through two or more compressors and coolers to boost the pressure of the vapor stream 101 from the feed gas pressure to about 10,343 kPa (1,500 psia). FIG. 3 shows a train of two compressors 132 and 133 for pressurizing the gas and conventional heat exchangers 134 and 135 after each compression stage for cooling the compressed gas. After the vapor stream 101 exits heat exchanger 135, reboiler 136 further cools it using liquid from demethanizer 131. From the reboiler 136, the cooled stream 101 is conveyed to a conventional phase separator 137. A vapor stream 103 from separator 137 is expanded by a conventional turboexpander 138, thereby reducing gas stream pressure before it enters the upper section of demethanizer 131. Turboexpander 138 preferably furnishes at least part of the power necessary to drive compressor 132. Liquids from separator 137 are passed by line 104 to the mid-section of the demethanizer 131.

As liquid is fed to the demethanizer column 131, it flows downward under the force of gravity. During its journey, this liquid is engaged by rising vapors, which strip the methane from the liquid as it passes upward. The stripping operation produces a substantially demethanized liquid product which is removed from the bottom of the demethanizer column 131 as stream 105.

The overhead vapor stream 106 exiting the demethanizer column is conveyed to a heat exchanger 139. After heating by heat exchanger 139, a first portion of the warmed vapor stream (stream 107) may optionally be withdrawn (stream 108) for use as a fuel for the gas liquefaction plant. A second portion of stream 107 is then passed through a train of compressors 140 and 141 and heat exchangers 142 and 143 to increase the pressure of the vapor stream and to provide cooling after each compression stage. The number of compression stages preferably range from two to four. A portion of the stream that exits heat exchanger 142 is withdrawn and is passed as stream 110 to heat exchanger 139 to further cool stream 110. The optimum fraction of stream 109 that is split off as stream 110 will depend on the temperature, pressure and composition of stream 109. This optimization can be performed by persons of ordinary skill in the art based on the teachings set forth herein. After exiting the heat exchanger 139, stream 110 is passed to an expansion means, such as turboexpander 144, which at least partially liquefies stream 110 to produce stream 111. Stream 111 is then passed to a conventional phase separator 145. The phase separator 145 produces PLNG (stream 121) at a temperature above about −112° C. (−170° F.) and a pressure sufficient for the liquid product to be at or below its bubble point. The PLNG is passed to a suitable storage means 153 for storing the PLNG at a temperature above −112° C. (−170° F.). Separator 145 also produces a pressurized gas vapor stream 115 that is combined with stream 106 for recycling.

Stream 112, which is the cooled stream exiting heat exchanger 143, is passed to an appropriate expansion means such as turboexpander 146 to reduce the pressure and to further cool stream 112. Turboexpander 146 at least partially liquefies the natural gas stream 112. After exiting the turboexpander 146, the partially liquefied stream is passed to a phase separator 147 to produce a liquid stream 113 and a vapor stream 114. The vapor stream 114 is conveyed back to and combined with the de-methanizer overhead vapor stream 106 for recycling. Liquid stream 113 exiting separator 147 is combined with stream 111.

Liquid stream 105 exiting the de-methanizer 131 is passed to a conventional condensate stabilizer 150 which produces an overhead stream 116 that is rich in ethane and other light hydrocarbons, primarily methane. The vapor overhead stream 116 is passed through heat exchanger 151, which cools the overhead vapor 116. A portion of stream 116 is then returned as reflux stream 117 to the condensate stabilizer 150. The remaining portion of stream 116 is passed through a compressor 152 to increase the pressure of stream 116 to approximately the pressure of stream 107. After being compressed, overhead stream 116 is cooled and the cooled gas (stream 118) is co-mingled with stream 107. Liquid exiting the bottom of condensate stabilizer 150 is available as a condensate product (stream 119).

The process of this invention, as illustrated in FIG. 3, may optionally re-liquefy boil-off vapor. Boil-off vapor may be introduced to the process illustrated in FIG. 3 through line 120, which is combined with overhead vapor stream 106.

Figure 4:
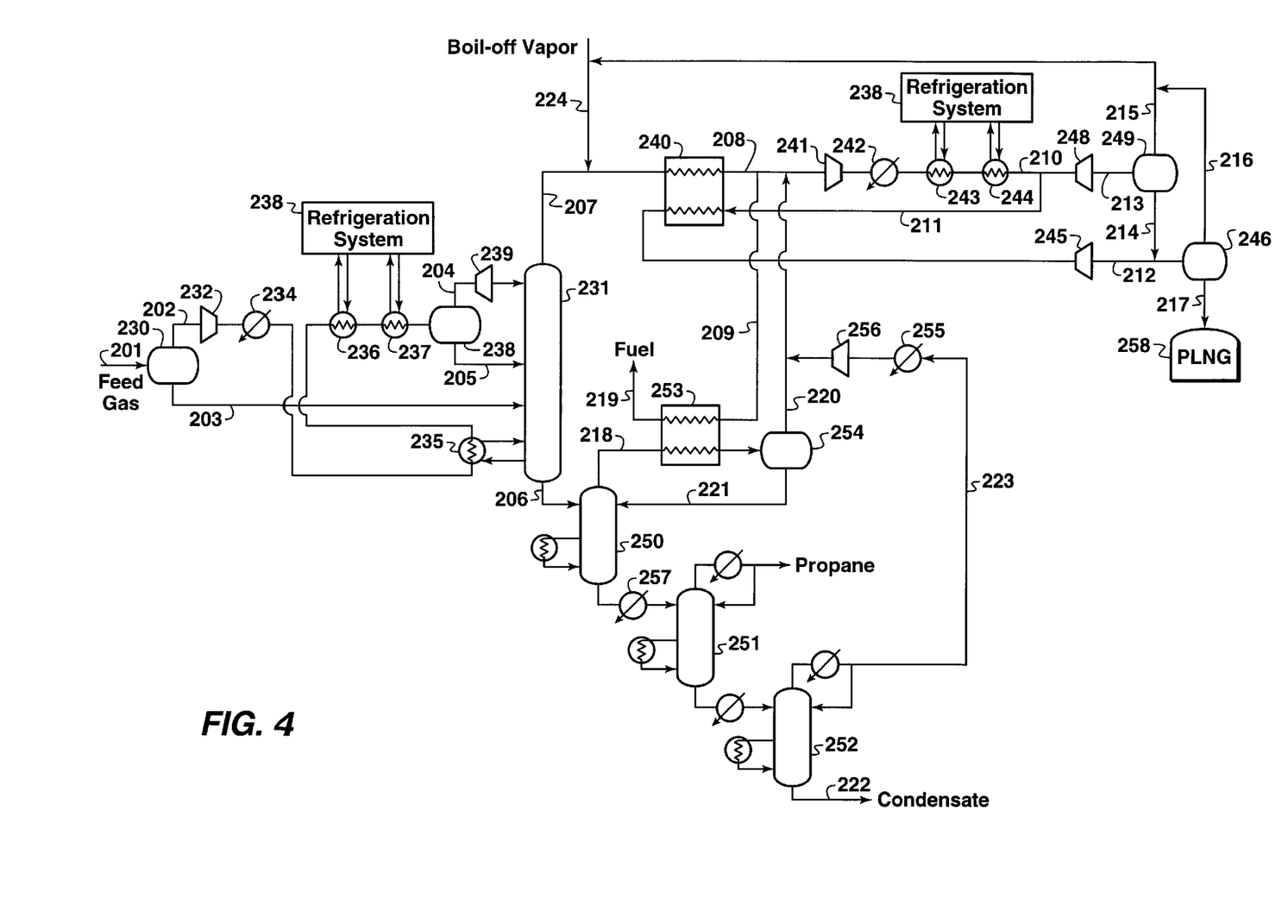
FIG. 4 is a schematic flow diagram of a fourth embodiment of this invention similar to the process illustrated in FIG. 3 in which a closed cycle refrigeration system and pressure expansion are used to produce PLNG.

Referring to FIG. 4, feed stream 201 enters separator 230 where the stream is divided into two separate streams, vapor stream 202 and liquid stream 203. This embodiment illustrates an external refrigeration loop to minimize power requirements and size of process equipment and a fractionation train for providing refrigeration make up for the refrigeration loop. Liquid stream 203 is passed to demethanizer column 231. Vapor stream 202 is compressed by one or more stages of compression, preferably two stages. For the sake of simplicity, FIG. 3 shows only one compressor 232. After each compression stage, the compressed vapor is preferably cooled by conventional air or water cooler, such as cooler 234. Gas stream 202, after exiting cooler 234, is cooled by reboiler 235 through which the demethanizer liquid flows from demethanizer column 231. From the reboiler 235, cooled stream 202 is further cooled by heat exchangers 236 and 237 which are cooled by a conventional closed-loop refrigeration system 238 in which the refrigerant is preferably propane. From exchangers 236 and 237 the cooled natural gas is again separated in conventional phase separator 238. A vapor stream 204 from separator 238 is expanded by a turboexpander 239, thereby reducing the gas stream pressure before it enters the upper section of demethanizer 231. Turboexpander 239 preferably provides power for compressor 232. Liquids from separator 238 are passed by line 205 to the mid-section of the demethanizer 231.

The overhead vapor stream 207 exiting the demethanizer 231 is conveyed to a heat exchanger 240. A portion of stream 208 that exits heat exchanger 240 may optionally be withdrawn (stream 209) for use as a fuel for the gas liquefaction plant. The remaining portion of stream 208 is compressed by one or more compressors 241 to a pressure, preferably between about 5,516 kPa (800 psia) and 13,790 kPa (2,000 psia). The compressed gas is then passed through a train of heat exchangers 242, 243, and 244 to cool the gas to produce stream 210. Heat exchanger 242 is preferably cooled by air or water. Heat exchangers 243 and 244 are preferably cooled by refrigeration system 238, the same system used for refrigeration of heat exchangers 236 and 237. A portion of stream 210 is passed as stream 211 to heat exchanger 240 to provide refrigeration duty for further cooling of vapor stream 211. Stream 211 that exits heat exchanger 240 is passed to an expansion means, such as turboexpander 245 which at least partially liquefies stream 211 to produce stream 212. Stream 212 is then passed to a conventional phase separator 246.

The portion of stream 210 that remains after stream 211 has been withdrawn is passed to an appropriate expansion means such as turboexpander 248 to reduce the gas pressure and to further cool the gas stream. Turboexpander 248 produces a stream 213 that is at least partially liquid natural gas. Stream 213 is passed to a conventional phase separator 249 to produce a liquid stream 214 and a vapor stream 215. Stream 215 is recycled by being combined with the demethanizer's overhead vapor stream 207. Liquid stream 214 is combined with stream 212 and passed to separator 246 which separates the gas into a vapor stream 216 and a liquid stream 217. Vapor stream 216, like vapor stream 215, is combined with the demethanizer's overhead stream 207 for recycling. Liquid stream 217 is PLNG, having a temperature above about −112° C. (−170° F.) and a pressure sufficient for the liquid to be at or below its bubble point, is sent to a suitable storage vessel 258 for storage at a temperature above about −112° C. (−170° F.).

Liquid stream 206 exiting the demethanizer 231 is passed to a fractionation system comprising a series of fractionation columns 250, 251, and 252. Fractionation column 250 is a conventional deethanizer which produces an overhead stream that is rich in ethane and other light hydrocarbons, primarily methane. Vapor overhead stream 218 is passed through heat exchanger 253 to warm fuel stream 209. After passing through heat exchanger 253, vapor stream 218 is passed to a conventional phase separator 254 which produces a vapor stream 220 and a liquid stream 221. Liquid stream 221 is returned to the deethanizer column 250 as reflux. Vapor stream 220 is combined with stream 208.

Liquids exiting the bottom of deethanizer 250 are cooled by heat exchanger 257 and passed to depropanizer 251. The vapor overhead from depropanizer 251 is rich in propane and may optionally be used as propane make up for refrigeration system 238. Liquids exiting the bottom of the depropanizer 251 are then passed to debutanizer 252. Liquids exiting the bottom of the debutanizer are withdrawn from the process as liquid condensate (stream 222). At least part of the vapor overhead from the debutanizer 252 is passed by line 223 through a heat exchanger 255 to cool the vapor stream. This vapor stream 223 is then passed through a compressor 256 to increase the pressure of stream 223 to approximately the pressure of stream 208. After exiting compressor 256, the compressed stream is combined with stream 220.

Boil-off vapor may be optionally introduced to the process of the present invention through line 224, which is combined with overhead vapor stream 207.

EXAMPLE

A simulated mass and energy balance was carried out to illustrate the embodiments illustrated in the Figures, and the results are set forth in Tables 1, 3, 4, and 5 below. The data presented in the Tables are offered to provide a better understanding of the embodiments shown in the Figures, but the invention is not to be construed as unnecessarily limited thereto. The temperatures and flow rates presented in the Tables are not to be considered as limitations upon the invention which can have many variations in temperatures and flow rates in view of the teachings herein.

The data were obtained using a commercially available process simulation program called HYSYS™, however, other commercially available process simulation programs can be used to develop the data, including for example HYSIM™, PROII™, and ASPEN PLUS™, which are familiar to those of ordinary skill in the art.

The power required to produce PLNG in accordance with this invention is significantly less than the power required to produce LNG at near atmospheric conditions and at a temperature of −164.5° C. (−264° F.) using an expansion process. Comparing Table 2 with Table 1 illustrates this power difference. Table 2 sets forth results of a simulated mass and energy balance using the flow process of FIG. 1 to produce LNG at near atmospheric pressures. The Table 2 results were based on producing near atmospheric pressure liquid product, significantly reduced amount of boil-off vapor being introduced to the process, and the need for staged recycle compression (Four recycle compressors instead of one compressor 50 shown in FIG. 1). In these two simulations, the total installed power required to produce conventional LNG (Table 2 data) was more than twice as much as required to produce PLNG (Table 1 data). Improvements to the PLNG-expansion process such as that depicted in FIG. 2, could also improve the conventional LNG process. However, the ratio of installed power for the conventional LNG and the installed power for the PLNG process in accordance with the practice of this invention would not change significantly. The PLNG process of this invention requires about one-half the power of using a conventional expansion process to produce LNG at atmospheric pressure.

The data presented in Table 3 are offered to provide a better understanding of the embodiment shown in FIG. 2. Compared to the embodiment shown in FIG. 1, the total installed power requirements of the FIG. 2 embodiment can be reduced from 198,359 kW (266,000 hp) to 111,857 kW (150,000 hp) by adding a propane refrigeration system. Those skilled in the art could further reduce the required power by optimizing the process.

The data presented in Table 4 are offered to provide a better understanding of the embodiment shown in FIG. 3. The feed gas in FIGS. 3 and 4 has a different composition and is at different conditions than the feed gas in FIGS. 1 and 2.

The data presented in Table 5 are offered to provide a better understanding of the embodiment shown in FIG. 4. This process once again demonstrates the advantage of the propane refrigeration system by significantly lowering the required installed power compared to that in embodiment shown in FIG. 3.

A person skilled in the art, particularly one having the benefit of the teachings of this patent, will recognize many modifications and variations to the specific processes disclosed above. For example, a variety of temperatures and pressures be used in accordance with the invention, depending on the overall design of the system and the composition of the feed gas. Also, the feed gas cooling train may be supplemented or reconfigured depending on the overall design requirements to achieve optimum and efficient heat exchange requirements. As discussed above, the specifically disclosed embodiments and examples should not be used to limit or restrict the scope of the invention, which is to be determined by the claims below and their equivalents.

TABLE 1

| Stream | Phase Vapor/ Liquid | Pressure kPa | Pressure psia | Temperature ° C. | Temperature ° F. | Flow Rate kgmole/ hr | Flow Rate lbmole/ hr | Composition, mole % $C_1$ | Composition, mole % $C_2$ | Composition, mole % $C_{3+}$ | Composition, mole % $N_2$ |
|---|---|---|---|---|---|---|---|---|---|---|---|
| 10 | V | 10,342 | 1,500 | 10 | 50.0 | 36,857 | 81,259 | 95.53 | 0.12 | 0.01 | 4.34 |
| 11 | V | 10,273 | 1,490 | −51.1 | −60.0 | 168,246 | 370,935 | 92.31 | 0.04 | 0 | 7.65 |
| 12 | V/L | 3,482 | 505 | −95.4 | −139.7 | 168,246 | 370,935 | 92.31 | 0.04 | 0 | 7.65 |
| 13 | L | 3,482 | 505 | −95.4 | −139.7 | 37,703 | 83,125 | 96.04 | 0.12 | 0.01 | 3.83 |
| 14 | V | 3,482 | 505 | −95.4 | −139.7 | 130,542 | 287,810 | 91.23 | 0.02 | 0 | 8.75 |
| 15 | V | 2,689 | 390 | 7.7 | 45.9 | 133,282 | 293,849 | 91.41 | 0.02 | 0 | 8.57 |
| 16 | V | 10,411 | 1,510 | 140.4 | 284.7 | 131,339 | 289,567 | 91.41 | 0.02 | 0 | 8.57 |
| 17 | V | 10,342 | 1,500 | 12.8 | 55.0 | 131,339 | 289,567 | 91.41 | 0.02 | 0 | 8.57 |

TABLE 1-continued

| | | | | | | | | | | | |
|---|---|---|---|---|---|---|---|---|---|---|---|
| 18 | V | 2,758 | 400 | −90 | −130.0 | 2,739 | 6,039 | 100 | 0 | 0 | 0 |
| 19 | V | 2,689 | 390 | 7.7 | 45.9 | 1,923 | 4,239 | 91.41 | 0.02 | 0 | 8.57 |

| | Power | |
|---|---|---|
| | Power hp | Power kW |
| Compressor 50 | 225,000 | 167,785 |
| Expander 30 | −41,000 | −30,574 |
| Net Power | 183,600 | 136,913 |
| Total Installed | 266,000 | 198,359 |

TABLE 2

| Stream | Phase Vapor/Liquid | Pressure kPa | Pressure psia | Temperature °C. | Temperature °F. | Flow Rate kgmole/hr | Flow Rate lbmole/hr |
|---|---|---|---|---|---|---|---|
| 10 | V | 10,342 | 1,500 | 10 | 50.0 | 36,857 | 81,259 |
| 11 | V | 10,273 | 1,490 | −58.6 | −73.5 | 114,604 | 252,671 |
| 12 | V/L | 110 | 16 | −164.5 | −264.1 | 114,604 | 252,671 |
| 13 | L | 110 | 16 | −164.5 | −264.1 | 33,022 | 72,803 |
| 14 | V | 110 | 16 | −164.5 | −264.1 | 81,633 | 179,977 |
| 15 | V | 103 | 15 | 6.9 | 44.4 | 81,633 | 179,977 |
| 16 | V | 10,377 | 1,505 | 105.4 | 221.7 | 77,748 | 171,412 |
| 17 | V | 10,342 | 1,500 | 12.8 | 55.0 | 77,748 | 171,412 |
| 19 | V | 103 | 15 | 6.9 | 44.4 | 3,885 | 8,565 |

TABLE 2-continued

| | Power | |
|---|---|---|
| | Power hp | Power kW |
| Compressors | | |
| 50, Stage 1 | 144,000 | 107,383 |
| 50, Stage 2 | 147,000 | 109,620 |
| 50, Stage 3 | 101,000 | 75,317 |
| 50, Stage 4 | 87,000 | 64,877 |
| Expander 30 | −110,000 | −82,028 |
| Net Power | 369,000 | 275,168 |
| Total Power | 589,000 | 439,224 |

TABLE 3

| Stream | Phase Vapor/Liquid | Pressure kPa | Pressure psia | Temperature °C. | Temperature °F. | Flow Rate kgmole/hr | Flow Rate lbmole/hr | Composition, mole % $C_1$ | $C_2$ | $C_{3+}$ | $N_2$ |
|---|---|---|---|---|---|---|---|---|---|---|---|
| 10 | V | 10,342 | 1,500 | 10 | 50.0 | 36,857 | 81,259 | 95.53 | 0.12 | 0.01 | 4.34 |
| 11 | V | 10,204 | 1,480 | −57.8 | −72.0 | 105,042 | 231,587 | 93 | 0.06 | 0 | 6.94 |
| 12 | V/L | 3,482 | 505 | −95.4 | −139.7 | 105,042 | 231,587 | 93 | 0.06 | 0 | 6.94 |
| 13 | L | 3,482 | 505 | −95.4 | −139.7 | 38,500 | 84,882 | 96.05 | 0.11 | 0.01 | 3.83 |
| 14 | V | 3,482 | 505 | −95.4 | −139.7 | 66,541 | 146,705 | 91.24 | 0.02 | 0 | 8.73 |
| 15 | V | 2,689 | 390 | −44.9 | −48.8 | 69,281 | 152,744 | 91.59 | 0.02 | 0 | 8.39 |
| 16 | V | 10,411 | 1,510 | 71.1 | 160.0 | 68,185 | 150,329 | 91.59 | 0.02 | 0 | 8.39 |
| 17 | V | 10,342 | 1,500 | 12.8 | 55.0 | 68,185 | 150,329 | 91.59 | 0.02 | 0 | 8.39 |
| 18 | V | 2,758 | 400 | −90 | −130.0 | 2,739 | 6,039 | 100 | 0 | 0 | 0 |
| 19 | V | 2,689 | 390 | −44.9 | −48.8 | 1,096 | 2,416 | 91.59 | 0.02 | 0 | 8.39 |

| | Power | |
|---|---|---|
| | Power hp | Power kW |
| Compressors | | |
| 50 | 90,000 | 67,114 |
| 80, Stage 1 | 31,000 | 23,117 |
| 80, Stage 2 | 7,000 | 5,220 |
| Expander 30 | −22,000 | −16,406 |
| Net Power | 106,000 | 79,045 |
| Total Installed | 150,000 | 111,857 |

TABLE 4

| Stream | Phase Vapor/Liquid | Pressure kPa | Pressure psia | Temperature °C. | Temperature °F. | Flow Rate kgmole/hr | Flow Rate lbmole/hr | Composition, mole % $C_1$ | $C_2$ | $C_{3+}$ | $CO_2$ | $N_2$ |
|---|---|---|---|---|---|---|---|---|---|---|---|---|
| 100 | V/L | 5,516 | 800 | 21.1 | 70.0 | 36,707 | 80,929 | 92.6 | 3.9 | 2.48 | 0.98 | 0.04 |
| 101 | V | 5,516 | 800 | 21.1 | 70.0 | 36,309 | 80,051 | 93.39 | 3.9 | 1.69 | 0.98 | 0.04 |
| 102 | L | 5,516 | 800 | 21.1 | 70.0 | 413 | 911 | 23.23 | 4.28 | 71.88 | 0.61 | 0 |
| 103 | V | 18,450 | 2,676 | 5.6 | 42.1 | 36,309 | 80,051 | 93.39 | 3.9 | 1.69 | 0.98 | 0.04 |
| 104 | | | | | | 0 | 0 | | | | | |
| 105 | L | 2,827 | 410 | 10.6 | 51.1 | 1,788 | 3,942 | 7.73 | 38.06 | 49.67 | 4.54 | 0 |
| 106 | V | 2,827 | 410 | −83.9 | −119.0 | 34,914 | 76,976 | 96.94 | 2.15 | 0.07 | 0.8 | 0.04 |
| 107 | V | 2,779 | 403 | 2.2 | 36.0 | 80,487 | 177,451 | 97.4 | 1.79 | 0.06 | 0.69 | 0.06 |
| 108 | V | 2,779 | 403 | 2.2 | 36.0 | 1,748 | 3,854 | 97.4 | 1.79 | 0.06 | 0.69 | 0.06 |
| 109 | V | 10,273 | 1,490 | 13.3 | 55.9 | 79,939 | 176,244 | 96.12 | 2.62 | 0.42 | 0.78 | 0.06 |
| 110 | V | 10,273 | 1,490 | 13.3 | 55.9 | 40,144 | 88,506 | 96.12 | 2.62 | 0.42 | 0.78 | 0.06 |
| 111 | V/L | 2,827 | 410 | −96.1 | −141.0 | 40,144 | 88,506 | 96.12 | 2.62 | 0.42 | 0.78 | 0.06 |
| 112 | V | 22,153 | 3,213 | 16.1 | 61.0 | 39,795 | 87,737 | 96.12 | 2.62 | 0.42 | 0.78 | 0.06 |
| 113 | L | 2,827 | 410 | −88.3 | −126.9 | 2,500 | 5,512 | 76.42 | 15.42 | 5.87 | 2.28 | 0.01 |
| 114 | V | 2,827 | 410 | −88.3 | −126.9 | 37,305 | 82,247 | 97.44 | 1.76 | 0.05 | 0.68 | 0.07 |
| 115 | V | 2,827 | 410 | −95.6 | −140.1 | 164 | 362 | 99.11 | 0.43 | 0.01 | 0.26 | 0.19 |
| 116 | V | 1,034 | 150 | 34.4 | 93.9 | 1,325 | 2,921 | 10.52 | 53.41 | 29.85 | 6.22 | 0 |
| 117 | L | 965 | 140 | 15.2 | 59.4 | 134 | 296 | 0.77 | 20.44 | 77.76 | 1.03 | 0 |
| 118 | V/L | 2,827 | 410 | 13.3 | 55.9 | 1,190 | 2,624 | 11.6 | 57.07 | 24.53 | 6.8 | 0 |
| 119 | L | 1,034 | 150 | 149 | 300.2 | 595 | 1,312 | 0 | 0 | 100 | 0 | 0 |
| 120 | V | 2,813 | 408 | −95.6 | −140.1 | 7,023 | 15,483 | 99.12 | 0.45 | 0.01 | 0.28 | 0.14 |
| 121 | L | 2,827 | 410 | −95.6 | −140.1 | 41,439 | 91,361 | 94.84 | 3.46 | 0.75 | 0.89 | 0.06 |

| | Power hp | Power kW |
|---|---|---|
| Compressors | | |
| 132 | 22,000 | 16,406 |
| 133 | 24,000 | 17,897 |
| 140, Stage 1 | 58,000 | 43,251 |
| 140, Stage 2 | 55,000 | 41,014 |
| 141, Stage 1 | 4,000 | 2,983 |
| 141, Stage 2 | 27,000 | 20,134 |
| 152 | 1,000 | 746 |
| Expanders | | |
| 138 | −22,000 | −16,406 |
| 144 | −4,000 | −2,983 |
| 146 | −27,000 | −20,134 |
| Net Power | 138,000 | 102,908 |
| Total Installed | 244,000 | 181,954 |

TABLE 5

| Stream | Phase Vapor/Liquid | Pressure kPa | Pressure psia | Temperature °C. | Temperature °F. | Flow Rate kgmole/hr | Flow Rate lbmole/hr | Composition, mole % $C_1$ | $C_2$ | $C_{3+}$ | $CO_2$ | $N_2$ |
|---|---|---|---|---|---|---|---|---|---|---|---|---|
| 201 | V/L | 5,516 | 800 | 21.1 | 70.0 | 36,707 | 80,929 | 92.6 | 3.9 | 2.48 | 0.98 | 0.04 |
| 202 | V | 5,516 | 800 | 21.1 | 70.0 | 36,309 | 80,051 | 93.39 | 3.9 | 1.69 | 0.98 | 0.04 |
| 203 | L | 5,516 | 800 | 21.1 | 70.0 | 413 | 911 | 23.23 | 4.28 | 71.88 | 0.61 | 0 |
| 204 | V | 7,957 | 1,154 | −37.5 | −35.5 | 35,711 | 78,733 | 94 | 3.81 | 1.17 | 0.98 | 0.04 |
| 205 | L | 7,957 | 1,154 | −37.5 | −35.5 | 588 | 1,296 | 56.28 | 9.12 | 33.16 | 1.43 | 0.01 |
| 206 | L | 2,827 | 410 | 7.8 | 46.0 | 1,798 | 3,964 | 8.35 | 37.77 | 49.4 | 4.48 | 0 |
| 207 | V | 2,827 | 410 | −85 | −121.0 | 34,914 | 76,976 | 96.94 | 2.16 | 0.06 | 0.8 | 0.04 |
| 208 | V | 2,779 | 403 | −38.3 | −36.9 | 69,878 | 154,062 | 97.71 | 1.55 | 0.05 | 0.63 | 0.06 |
| 209 | V | 2,779 | 403 | −38.3 | −36.9 | 1,753 | 3,865 | 97.71 | 1.55 | 0.05 | 0.63 | 0.06 |
| 210 | V | 10,135 | 1,470 | −37.5 | −35.5 | 69,281 | 152,744 | 96.29 | 2.5 | 0.41 | 0.74 | 0.06 |
| 211 | V | 10,135 | 1,470 | −37.5 | −35.5 | 35,313 | 77,855 | 96.29 | 2.5 | 0.41 | 0.74 | 0.06 |
| 212 | L | 2,827 | 410 | −96.7 | −142.1 | 35,313 | 77,855 | 96.29 | 2.5 | 0.41 | 0.74 | 0.06 |
| 213 | V/L | 2,827 | 410 | −92.2 | −134.0 | 34,018 | 75,000 | 96.29 | 2.5 | 0.41 | 0.74 | 0.06 |
| 214 | L | 2,827 | 410 | −92.2 | −134.0 | 6,076 | 13,397 | 86.9 | 9.13 | 2.17 | 1.78 | 0.02 |
| 215 | V | 2,827 | 410 | −92.2 | −134.0 | 27,941 | 61,603 | 98.33 | 1.06 | 0.03 | 0.51 | 0.07 |
| 216 | | | | | | 0 | 0 | | | | | |
| 217 | L | 2,827 | 410 | −95.6 | −140.1 | 41,339 | 91,142 | 94.92 | 3.47 | 0.66 | 0.89 | 0.06 |
| 218 | V | 2,779 | 403 | 5.6 | 42.1 | 707 | 1,559 | 10.76 | 78.62 | 3.7 | 6.92 | 0 |

TABLE 5-continued

| 219 | V | 2,758 | 400 | 10 | 50.0 | 1,753 | 3,865 | 97.71 | 1.55 | 0.05 | 0.63 | 0.06 |
| 220 | V | 2,779 | 403 | -3.3 | 26.1 | 374 | 824 | 16.28 | 73.46 | 1.52 | 8.74 | 0 |
| 221 | L | 2,779 | 403 | -3.3 | 26.1 | 334 | 736 | 4.63 | 84.35 | 6.12 | 4.9 | 0 |
| 222 | L | 1,034 | 150 | 149 | 300.2 | 608 | 1,340 | 0 | 0 | 100 | 0 | 0 |
| 223 | V | 1,020 | 148 | 21.1 | 70.0 | 787 | 1,735 | 11.35 | 51.32 | 31.24 | 6.09 | 0 |
| 224 | V | 2,813 | 408 | -95.6 | -140.1 | 7,023 | 15,483 | 99.12 | 0.45 | 0.01 | 0.28 | 0.14 |

| | Power | |
|---|---|---|
| | Power hp | Power kW |
| Compressors | | |
| 232, Stage 1 | 11,000 | 8,203 |
| 232, Stage 2 | 4,000 | 2,983 |
| 238, Stage 1 | 9,000 | 6,711 |
| 238, Stage 2 | 26,000 | 19,389 |
| 241, Stage 1 | 43,000 | 32,066 |
| 241, Stage 2 | 45,000 | 33,557 |
| 56 | 1,000 | 746 |
| Expanders | | |
| 239 | 11,000 | 8,203 |
| 245 | 4,000 | 2,983 |
| 248 | 11,000 | 8,203 |
| Net Power | 113,000 | 84,265 |
| Total Installed | 165,000 | 123,043 |

What is claimed is:

1. A process for liquefying a gas stream rich in methane which comprises the steps of:
    (a) providing the gas stream at a pressure above about 3103 kPa (450 psia);
    (b) expanding the gas stream to a lower pressure to produce a gas phase and a liquid product having a temperature above about −112° C. (−170° F.) and a pressure sufficient for the liquid product to be at or below its bubble point;
    (c) phase separating the gas phase and the liquid product; and
    (d) introducing the liquid product to a storage means for storage at a temperature above about −112° C. (−170° F.).

2. The process of claim 1 further comprises cooling the gas stream prior to step (b).

3. The process of claim 2 further comprises cooling the gas stream in a heat exchanger cooled by a closed-loop refrigeration system.

4. The process of claim 3 wherein the closed-loop refrigeration system has propane as the predominant refrigerant.

5. The process of claim 3 wherein the closed-loop refrigeration system has carbon dioxide as the predominant refrigerant.

6. The process of claim 2 further comprises the step of cooling the gas stream by heat exchange relationship with the gas phase of step (c) of claim 1, thereby warming the gas phase.

7. The process of claim 6 further comprises compressing the warmed gas phase, cooling the compressed gas phase, and returning the cooled compressed gas phase to the gas stream of step (a) of claim 1 for recycling.

8. The process of claim 6 further comprises, prior to the cooling step of claim 6, cooling the gas stream in a heat exchanger cooled by a closed-loop refrigeration system.

9. The process of claim 1 wherein prior to liquefaction of the gas stream further comprises combining with the gas stream a boil-off gas resulting from evaporation of liquefied natural gas.

10. The process of claim 1 wherein the gas stream contains methane and hydrocarbon components heavier than methane, which further comprises removing a predominant portion of the heavier hydrocarbons by fractionation to produce a vapor stream rich in methane and a liquid stream rich in the heavier hydrocarbons, the vapor stream then being liquefied by expansion according to step (b) of claim 1.

11. The process of claim 10 further comprising cooling the gas stream prior to fractionation of the gas stream.

12. The process of claim 1 wherein the liquefaction of the gas stream is performed without a closed-loop refrigeration system.

13. A process for liquefing a gas stream rich in methane and having a pressure above about 3103 kPa (450 psia) which comprises the steps of
    (a) phase separating the gas stream into a first gas stream and a first liquid stream;
    (b) passing the first liquid stream to a demethanizer column;
    (c) compressing and cooling the first gas stream, thereby producing gas and liquid phases;
    (d) phase separating the gas and liquid phases of step (c) to produce a second gas stream and a second liquid stream;
    (e) expanding at least a portion of the second gas stream to a lower pressure whereby the second gas stream is further cooled;
    (f) supplying the second liquid stream and the expanded second gas stream to the demethanizer column;
    (g) removing from the upper region of the demethanizer column a third gas stream, the third gas stream comprising predominantly methane, and passing the third gas stream through a heat exchanger to warm the third gas stream;
    (h) removing from the demethanizer a third liquid stream and passing the third liquid stream to a fractionation system having at least one fractionation column and having at least one overhead vapor stream;

(i) combining the warmed third gas stream of step (g) and the overhead vapor stream of step (h) and compressing the combined stream;

(j) cooling the compressed combined stream;

(k) dividing the cooled compressed stream of step (j) into a first cooled stream and a second cooled stream and passing the first cooled stream through the heat exchanger of step (g) to further cool the first cooled stream;

(l) expanding the first cooled stream to produce gas and liquid phases;

(m) phase separating the gas and liquid phases of step (l) in a phase separator, thereby producing a methane-rich liquefied natural gas at a temperature above about −112° C. (−170° F.) and a pressure sufficient for the methane-rich liquefied natural gas to be at or below its bubble point;

(n) expanding the second cooled stream of step (k) to a lower pressure whereby it is further cooled, producing gas and liquid phases;

(o) phase separating the gas and liquid phases produced in step (n); and (p) passing the liquid phase of step (o) to the phase separator of step (m).

14. The process of claim 13 further comprises combining the gas phase of step (o) with the third gas stream of step (g) and passing the combined gas stream through the heat exchanger of step (g).

15. The process of claim 13 further comprises combining the gas phase of step (m) with the third gas stream of step (g) and passing the combined gas stream through the heat exchanger of step (g).

16. The process of claim 14 wherein the cooling of step (j) is by indirect heat exchange with refrigerant from a closed-loop refrigeration system.

17. The process of claim 16 wherein the closed-loop refrigeration system has propane as the predominant refrigerant and the fractionation system of step (h) comprises a depropanizer column producing an overhead stream gas rich in propane, further comprising passing to the closed-loop refrigeration system the propane-rich stream gas from the fractionation system as make-up refrigerant.

18. A process according to claim 14 wherein the process further comprises introducing into the third gas stream of step (g) a boil-off gas resulting from the evaporation of a liquefied natural gas and passing the combined third gas stream and the boil-off gas through the heat exchanger of step (g).

19. A process for liquefying a gas stream rich in methane which comprises the steps of:

(a) compressing the gas stream to a pressure greater than 3103 kPa (450 psia);

(b) phase separating the gas stream into a first gas stream and a first liquid stream;

(c) passing the first liquid stream to a demethanizer column;

(d) compressing and cooling the first gas stream without use of a closed-loop refrigeration system, thereby producing gas and liquid phases;

(e) phase separating the gas and liquid phases of step (d) to produce a second gas stream and a second liquid stream;

(f) expanding at least a portion of the second gas stream to a lower pressure whereby it is further cooled;

(g) supplying the second liquid stream and the expanded second gas stream to the demethanizer column;

(h) removing from the upper region of the demethanizer column a vapor stream, the vapor stream comprising predominantly methane, and passing the vapor stream through a heat exchanger to warm the vapor stream;

(i) removing from the demethanizer a liquid stream and passing the liquid stream to a fractionation system having at least one fractionation column and having at least one overhead vapor stream;

(j) combining the warmed vapor stream of step (h) and the overhead vapor stream of step (i) and compressing the combined stream;

(k) cooling the compressed combined stream of step (j) without use of a closed-loop refrigeration system;

(l) dividing the cooled compressed stream of step (k) into a first cooled stream and a second cooled stream and passing the first cooled stream through the heat exchanger of step (h) to further cool the first cooled stream;

(m) expanding the first cooled stream to produce gas and liquid phases;

(n) phase separating the gas and liquid phases of step (m) in a phase separator, thereby producing a methane-rich liquefied natural gas having a temperature above about −112° C. (−170° F.) and a pressure sufficient for the methane-rich liquefied natural gas to be at or below its bubble point;

(o) expanding the second cooled stream of step (l) to a lower pressure whereby it is further cooled, producing gas and liquid phases;

(p) phase separating the gas and liquid phases produced in step (o); and (q) passing the liquid phase of step (o) to the phase separator of step (n).

20. A process according to claim 19 wherein the process further comprises introducing into the vapor stream of step (h) a boil-off gas resulting from the evaporation of a liquefied natural gas and passing the combined vapor stream of step (h) and the boil-off gas through the heat exchanger of step (h).

21. The process of claim 19 wherein the gas phase of step (n) is combined with the vapor residue of step (h) and the combined gas stream is passed through the heat exchanger of step (h).

22. The process of claim 19 wherein the lowering of cooling of the gas stream temperature in step (d) is performed by water or air.

23. The process of claim 19 further comprising before step (o) the additional step of pressurizing the second cooled stream of step (l) to a higher pressure.

24. A process for liquefying a gas stream rich in methane and having a pressure above about 3103 kPa (450 psia) which comprises the steps of:

(a) cooling the gas stream;

(b) passing the cooled gas stream through a heat exchanger to warm the gas stream;

(c) compressing the warmed gas stream and after-cooling the compressed gas stream;

(d) dividing the cooled compressed stream of step (c) into a first cooled stream and a second cooled stream and passing the first cooled stream through the heat exchanger of step (b) to further cool the first cooled stream;

(e) expanding the first cooled stream to produce gas and liquid phases;

(f) phase separating the gas and liquid phases of step (e) in a phase separator, thereby producing a gas phase and a methane-rich liquefied gas at a temperature above about −112° C. (−170° F.) and a pressure sufficient for the methane-rich liquefied gas to be at or below its bubble point;

(g) expanding the second cooled stream of step (d) to a lower pressure whereby it is further cooled, producing gas and liquid phases;

(h) phase separating the gas and liquid phases of step (g); and (i) passing the liquid phase of step (h) to the phase separator of step (f).

25. The process of claim 24 further comprising before step (g) the additional step of pressurizing the second cooled stream to a higher pressure.

26. The process of claim 24 further comprising the steps of introducing into the cooled gas of step (a) a boil-off gas resulting from the evaporation of a liquefied natural gas and passing the combined cooled vapor stream of step (a) and the boil-off gas through the heat exchanger of step (b).

27. The process of claim 24 wherein the gas phase of step (f) is combined with the cooled gas stream of step (a) and the combined stream is passed through the heat exchanger of step (b).

28. The process of claim 24 wherein the gas phase of step (h) is combined with the cooled gas stream of step (a) and the combined stream is passed through the heat exchanger of step (b).

29. The process of claim 24 wherein the gas phase of step (f) and the gas phase of step (h) are combined with the cooled gas stream of step (a) and the combined stream is passed through the heat exchanger of step (b).

* * * * *